United States Patent
Sovern

(10) Patent No.: US 10,988,171 B2
(45) Date of Patent: Apr. 27, 2021

(54) STEERING RACK STOPPER

(71) Applicant: HONDA MOTOR CO., LTD., Tokyo (JP)

(72) Inventor: Jason A. Sovern, Marysville, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 271 days.

(21) Appl. No.: 16/375,585

(22) Filed: Apr. 4, 2019

(65) Prior Publication Data
US 2020/0317262 A1 Oct. 8, 2020

(51) Int. Cl.
*B62D 7/16* (2006.01)
*B62D 7/22* (2006.01)
*B62D 3/12* (2006.01)
*F16H 19/04* (2006.01)

(52) U.S. Cl.
CPC .............. *B62D 7/163* (2013.01); *B62D 3/12* (2013.01); *B62D 7/16* (2013.01); *B62D 7/22* (2013.01); *B62D 7/228* (2013.01); *F16H 19/04* (2013.01); *F16H 2019/046* (2013.01)

(58) Field of Classification Search
CPC ........ B62D 3/12; B62D 3/126; B62D 5/0469; B62D 5/061; B62D 7/163; B62D 7/226; B62D 7/228; B60G 7/04; B60G 2500/40; F16H 19/04; F16H 2019/046
See application file for complete search history.

(56) References Cited

U.S. PATENT DOCUMENTS

| | | | | | |
|---|---|---|---|---|---|
| 4,660,845 | A | * | 4/1987 | Herr | B62D 5/061 180/434 |
| 5,052,528 | A | * | 10/1991 | Sullivan | F16F 9/48 188/317 |
| 5,379,856 | A | * | 1/1995 | Blee | B62D 3/12 180/400 |
| 5,435,590 | A | * | 7/1995 | Larsson | B60G 3/00 180/257 |
| 5,788,009 | A | * | 8/1998 | Lee | B62D 3/12 180/428 |

(Continued)

FOREIGN PATENT DOCUMENTS

| | | |
|---|---|---|
| CN | 101698416 A | 4/2010 |
| CN | 103241282 A | 8/2013 |

(Continued)

*Primary Examiner* — Barry Gooden, Jr.
(74) *Attorney, Agent, or Firm* — Arent Fox LLP

(57) ABSTRACT

The disclosure provides a steering system for a vehicle. The steering system includes a wheel having an inner surface and an outer surface, and a tire mounted thereon. The steering system includes a wheel support including an upper arm and a lower arm that rotatably support the wheel. At least one of the upper arm and the lower arm includes a curved member positioned to contact the inner surface of the wheel when the wheel is at a maximum steering angle. The steering system includes a steering rack and a tie rod coupled between the steering rack and the wheel support. The steering system also includes a compressible stopper coupled between the tie rod and the steering rack. The stopper is configured to compress as the wheel is turned toward the maximum steering angle and when the tie rod is moved past the maximum steering angle.

20 Claims, 5 Drawing Sheets

(56) References Cited

U.S. PATENT DOCUMENTS

| | | | |
|---|---|---|---|
| 6,047,977 A * | 4/2000 | Brokholc | B60G 7/008 280/93.5 |
| 6,089,589 A | 7/2000 | Miyazaki | |
| 6,223,863 B1 * | 5/2001 | Bunker | F16D 55/32 188/18 A |
| 6,398,240 B1 * | 6/2002 | Taylor | B60G 3/18 280/93.511 |
| 6,467,567 B2 | 10/2002 | Kobayashi et al. | |
| 7,275,618 B2 | 10/2007 | Abe et al. | |
| 7,967,304 B2 * | 6/2011 | Kwon | B62D 9/00 280/89 |
| 8,662,509 B2 | 3/2014 | Shiraishi et al. | |
| 8,925,939 B2 | 1/2015 | Ohashi | |
| 9,156,493 B1 | 10/2015 | Kimijima et al. | |
| 9,193,384 B1 * | 11/2015 | Murakami | F16H 55/24 |
| 9,290,199 B2 * | 3/2016 | Bando | B62D 5/0448 |
| 9,302,697 B2 | 4/2016 | Ohashi | |
| 9,302,698 B2 | 4/2016 | Enomoto | |
| 9,873,448 B2 | 1/2018 | Mullins et al. | |
| 10,011,295 B2 | 7/2018 | Ohashi | |
| 2004/0216548 A1 * | 11/2004 | Bieber | B62D 3/12 74/388 PS |
| 2005/0167182 A1 * | 8/2005 | Abe | B62D 5/0403 180/444 |
| 2006/0131828 A1 * | 6/2006 | Tanaka | B62D 3/12 280/93.514 |
| 2010/0171281 A1 * | 7/2010 | Rey | B62D 7/09 280/93.515 |
| 2010/0284733 A1 * | 11/2010 | Ungruh | F16C 11/0619 403/133 |
| 2012/0111132 A1 * | 5/2012 | Schaumann | B62D 3/12 74/29 |
| 2012/0242054 A1 * | 9/2012 | Shiraishi | B62D 3/12 280/93.514 |
| 2014/0034410 A1 * | 2/2014 | Jackson | B62D 3/12 180/444 |
| 2014/0137692 A1 * | 5/2014 | Ohashi | B62D 3/12 74/492 |
| 2015/0151787 A1 * | 6/2015 | Ohashi | B62D 7/163 280/93.511 |
| 2015/0158520 A1 * | 6/2015 | Watanabe | F16F 7/095 280/93.514 |
| 2015/0226315 A1 * | 8/2015 | Iizuka | F16H 55/283 74/409 |
| 2015/0274192 A1 * | 10/2015 | Enomoto | B62D 7/226 280/93.51 |
| 2015/0274194 A1 * | 10/2015 | Kimijima | B62D 3/126 280/777 |
| 2016/0052539 A1 * | 2/2016 | Ueno | B62D 7/163 74/109 |
| 2017/0113718 A1 * | 4/2017 | Ohashi | B62D 3/12 |
| 2017/0113719 A1 * | 4/2017 | Ohashi | B62D 7/163 |
| 2017/0158221 A1 * | 6/2017 | Yamamoto | B62D 1/04 |
| 2017/0267277 A1 * | 9/2017 | Ohashi | B62D 3/12 |
| 2017/0267282 A1 | 9/2017 | Ogata | |
| 2017/0297608 A1 * | 10/2017 | Span | B62D 3/12 |
| 2018/0297628 A1 * | 10/2018 | Bando | B62D 3/123 |
| 2018/0334187 A1 * | 11/2018 | Kato | B62D 3/12 |
| 2019/0031227 A1 * | 1/2019 | Hanada | B62D 3/12 |
| 2019/0085928 A1 * | 3/2019 | Mizumachi | F16F 1/3713 |
| 2020/0070870 A1 * | 3/2020 | Terada | B62D 1/19 |
| 2020/0094868 A1 * | 3/2020 | Yamazaki | B62D 5/0448 |
| 2020/0370618 A1 * | 11/2020 | Hanada | F16F 15/08 |

FOREIGN PATENT DOCUMENTS

| | | |
|---|---|---|
| CN | 203666761 U | 8/2013 |
| CN | 105946964 A | 9/2016 |
| CN | 104290802 B | 2/2017 |
| DE | 102007012655 A1 | 7/2008 |
| GB | 2290761 B | 3/1996 |
| JP | 2012-206565 A | 10/2012 |
| JP | 2013-159293 A | 8/2013 |
| JP | 2015-112960 A | 6/2015 |
| JP | 2015-186950 A | 10/2015 |
| JP | 2015-214249 A | 12/2015 |
| JP | 2016-137797 A | 6/2016 |

* cited by examiner

US 10,988,171 B2

STEERING RACK STOPPER

TECHNICAL FIELD

Aspects of the present disclosure relate to systems, devices and methods of operating thereof in automotive assembly, and in particular to systems, devices and methods of operating thereof for vehicle steering systems.

BACKGROUND

A vehicle may include a steering system. For example, a rack and pinion steering system may use a pinion attached to a steering shaft to laterally translate the rack. The rack, in turn, may be coupled to the steerable wheels via a tie rod. In some cases, an impact to a steerable wheel when the rack is at a maximum steering angle may cause the tie rod to buckle, causing persistent damage to the steering system.

In view of the foregoing, there is a need for improved steering systems for vehicles and techniques for manufacturing such steering systems. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the present disclosure provides a steering system for a vehicle. The steering system may include a wheel having an inner surface and an outer surface, and a tire mounted thereon. The steering system may further include a wheel support including an upper arm and a lower arm that rotatably support the wheel. At least one of the upper arm and the lower arm may include a curved member positioned to contact the inner surface of the wheel when the wheel is at a maximum steering angle. The steering system may further include a steering rack and a tie rod coupled between the steering rack and the wheel support. The steering system may also include a compressible stopper coupled between the tie rod and the steering rack. The stopper may be configured to compress as the wheel is turned toward the maximum steering angle and when the tie rod is moved past the maximum steering angle.

In another aspect, the present disclosure provides a vehicle. The vehicle may include at least two steerable wheels, each steerable wheel having an inner surface and an outer surface, and a tire mounted thereon. The vehicle may include a wheel support for each steerable wheel comprising an upper arm and a lower arm that rotatably support the steerable wheel, wherein at least one of the upper arm and the lower arm includes a curved member positioned to contact the inner surface of the steerable wheel when the steerable wheel is at a maximum steering angle. The vehicle may include a steering rack and a tie rod coupled between a respective end of the steering rack and the respective wheel support. The vehicle may include a compressible stopper coupled between the respective tie rod and the respective end of the steering rack, the stopper configured to compress as the wheel is turned toward the maximum steering angle and when the tie rod is moved past the maximum steering angle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "vehicle," as used herein, refers to any manned or unmanned structure capable of moving and is powered by any form of energy. The term "vehicle" includes, but is not limited to: cars, trucks, vans, minivans, SUVs, motorcycles, scooters, boats, personal watercraft, submersibles, aircraft, and spacecraft. In some cases, a motor vehicle includes one or more engines.

It should be understood that the description and drawings herein are merely illustrative and that various modifications and changes can be made in the structures disclosed without departing from the present disclosure. In general, the figures of the example vehicle roof structure are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the example vehicle door system disclosed herein are merely terms of art that may vary from one manufacturer to another and should not be deemed to limit the present disclosure.

Generally described, the present disclosure provides for a steering system for a vehicle including at least two dampening mechanisms to prevent damage to a tie rod. A first dampening mechanism may include a curved member of an arm of a wheel support. The arm may be referred to as a control arm, wishbone, or A-arm. The curved member may include a surface configured to contact an inner surface of the steerable wheel when the steerable wheel is at a maximum steering angle. Contact between the curved member and the inner surface of the rim may prevent rotation of the steerable wheel past the maximum steering angle due to impacts on the steerable wheel.

The second dampening mechanism may include a compressible stopper coupled between the tie rod and the steering rack. The compressible stopper may compress as the steerable wheel approaches the maximum steering angle. Accordingly, the compressible stopper may absorb impacts on the tie rod. Additionally, the compressible stopper may dampen an impact of the curved member contacting the inner surface of the rim.

By using two dampening mechanisms, the present disclosure provides a steering system that reduces likelihood of the steering tie rod buckling and/or reduces the weight or strength requirements of the tie rod or other suspension components.

Figure 1:
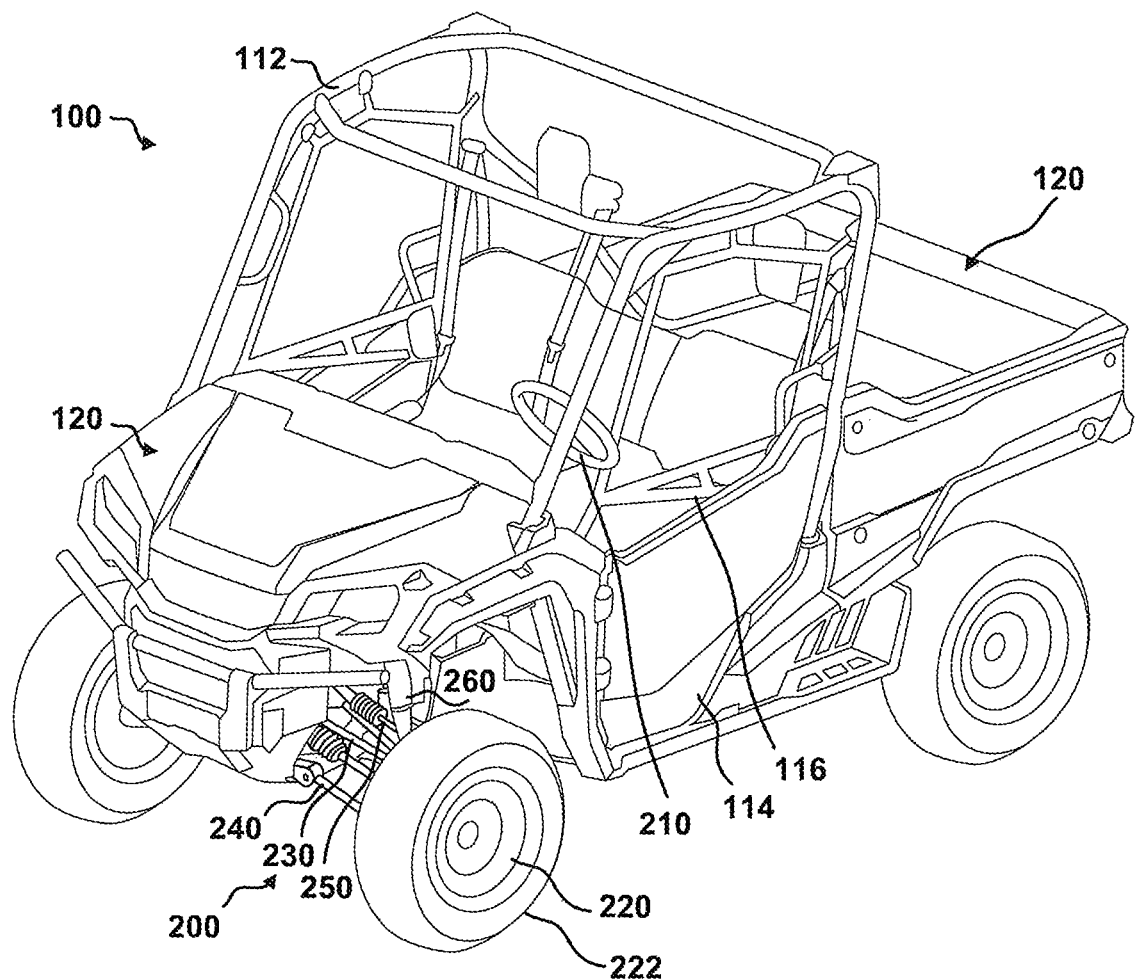
FIG. 1 shows a perspective view of an example multi-use vehicle having steering system, according to an aspect of the disclosure.

Turning to the figures, in which like reference numbers refer to like components, FIG. 1 illustrates an example vehicle 100 including a steering system 200. The vehicle 100 may be a multi-use vehicle (MUV), off-road vehicle, or other vehicle designed for off-road driving. The vehicle 100 may include a passenger area 110, an engine compartment 120, and a rear cargo area 130. In an aspect, the passenger area 110 may be surrounded by a roll cage 112. The passenger area may include a two-part door including a rigid lower portion 114 and flexible (e.g., netting) upper portion 116.

The steering system 200 may include a steering wheel 210 that is coupled to steerable wheels 220 via a steering shaft, pinion, steering rack (not shown in FIG. 1), and tie rods 250. The steering system 200 may also include suspension components such as an upper control arm 230, lower control arm 240, and a cushion or shock absorber 260. In an aspect, the vehicle 100 may experience an impact to a wheel 220 or tire 222 during a turn. The steering system 200 may including multiple dampening mechanisms to prevent damage to steering system components such as the steering rack and tie rods 250.

Figure 2:
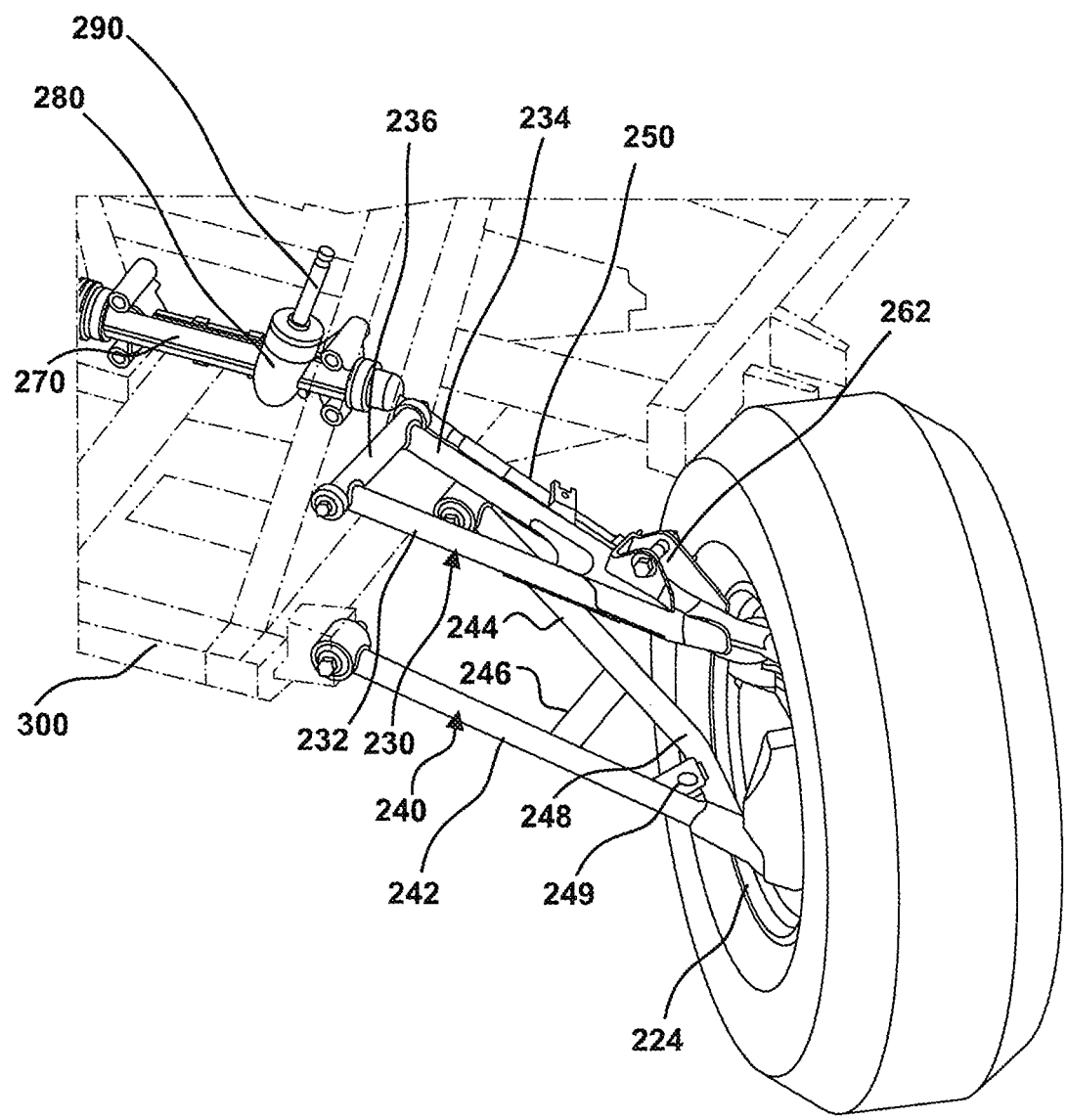
FIG. 2 shows a perspective view of an example vehicle frame and steering system, according to an aspect of the disclosure.

FIG. 2 shows a perspective view of various components of the steering system 200 connected to a vehicle frame 300. An outward direction may refer to a direction away from the vehicle frame 300, and an outer element may refer to an element that is located in the outward direction. Conversely, an inward direction may refer to a direction toward the vehicle frame 300, and an inner element may refer to an element that is located in the inward direction. Further, FIG. 2 shows the front left side of the example steering system 200. It should be understood that the front right side of the example steering system may include opposite components arrange symmetrically with the left side.

The upper control arm 230 may also be referred to as an A-arm or wishbone. The upper control arm 230 may include a front member 232 and a rear member 234. The inner ends of the front member 232 and the rear member 234 may be connected via a cylindrical pivot pipe 236 that pivotably mounts to the frame 300, for example, via a bolt that passes through a bracket of the frame 300 and the cylindrical pivot pipe 236. The outer ends of the front member 232 and the rear member 234 may be joined together to form a triangle shape of the upper control arm 230. A bracket 262 may be formed at the juncture of the front member 232 and the rear member 234 and be coupled to the cushion or shock absorber 260 (FIG. 1). The outer end of the upper control arm 230 may support a vertical pivot that connects to the lower control arm 240 and allows the wheel 220 to turn about a vertical axis.

The lower control arm 240 may also be referred to as an A-arm or wishbone. The lower control arm 240 may include a forward member 242, a rear member 244, and a cross member 246. The lower control arm 240 may be pivotably coupled to the frame 300 at an inner end of each of the forward member 242 and the rear member 244. For example, each of the forward member 242 and the rear member 244 may include a cylindrical pivot pipe that receives a bolt that also passes through a bracket of the frame 300. The outer end of the lower control arm 240 may be connected to a vertical pivot that allows the wheel 220 to rotate about a vertical axis.

In an aspect, the lower control arm 240 may include a curved portion 248. The curved portion 248 may be concave such that the outer surface of the curved portion 248 faces the inner surface 224 of the wheel 220. The radius of curvature of the curved portion 248 may be less than a radius of curvature of the inner surface 224 of the wheel 220 and the tire 222 such that when the wheel 220 is turned to a maximum steering angle, the outer surface of the curved portion 248 may contact the inner surface 224 of the wheel 220 without contacting the tire 222. Accordingly, the metal on metal contact between the outer surface of the curved portion 248 and the inner surface 224 of the wheel 220 may prevent further rotation of the wheel 220 about the vertical axis past the maximum steering angle. Force causing the rotation of the wheel 220 (e.g., from an impact) may be transferred to the lower control arm 240. The metal on metal contact may allow the wheel 220 to continue rotating about the horizontal axis by sliding along the curved portion 248. In an aspect, the curved portion 248 may be reinforced. For example, the cross member 246 and a reinforcement cross member 249 may be located between the rear member 244 and the forward member 242 near the curved portion 248. For example, the cross member 246 and the reinforcement cross member 249 may be on the opposite sides of the curved portion 248 to provide reinforcement. The curved portion 248 may also be reinforced by having thicker dimensions or cladding to withstand the metal on metal contact.

The steering system 200 may be a rack and pinion type steering system. The steering wheel 210 may be connected to the steering shaft 290, which may be connected to a pinion gear within pinion housing 280. The teeth of the pinion gear may engage teeth of a steering rack within the rack housing 270. Turning the steering wheel 210 may cause the pinion gear to rotate and slide the steering rack laterally, left or right, depending on the direction the steering wheel 210 is turned. The steering rack may be coupled to a tie rod 250 that connects to the vertical pivot between the control arms 230, 240. Accordingly, the tie rod 250 may turn the lateral movement of the steering rack into turning of the wheel 220 about the vertical axis.

In an aspect, a rack and pinion steering system may experience damage in the case of an impact when the steering system is at a maximum steering angle. For example, an impact from the wheel 220 hitting a rock or log while making a turn may impart forces that would cause the wheel 220 to turn past the maximum steering angle. The forces may be applied to the tie rod 250. Since the rack is already at the maximum steering angle, the tie rod may not be able to further move the rack, and the additional forces on the tie rod 250 may cause the tie rod 250 to buckle. The buckled tie rod may be a persistent damage that requires the tie rod to be replaced. Accordingly, a steering system that prevents damage to the tie rod may be desirable.

Figure 3:
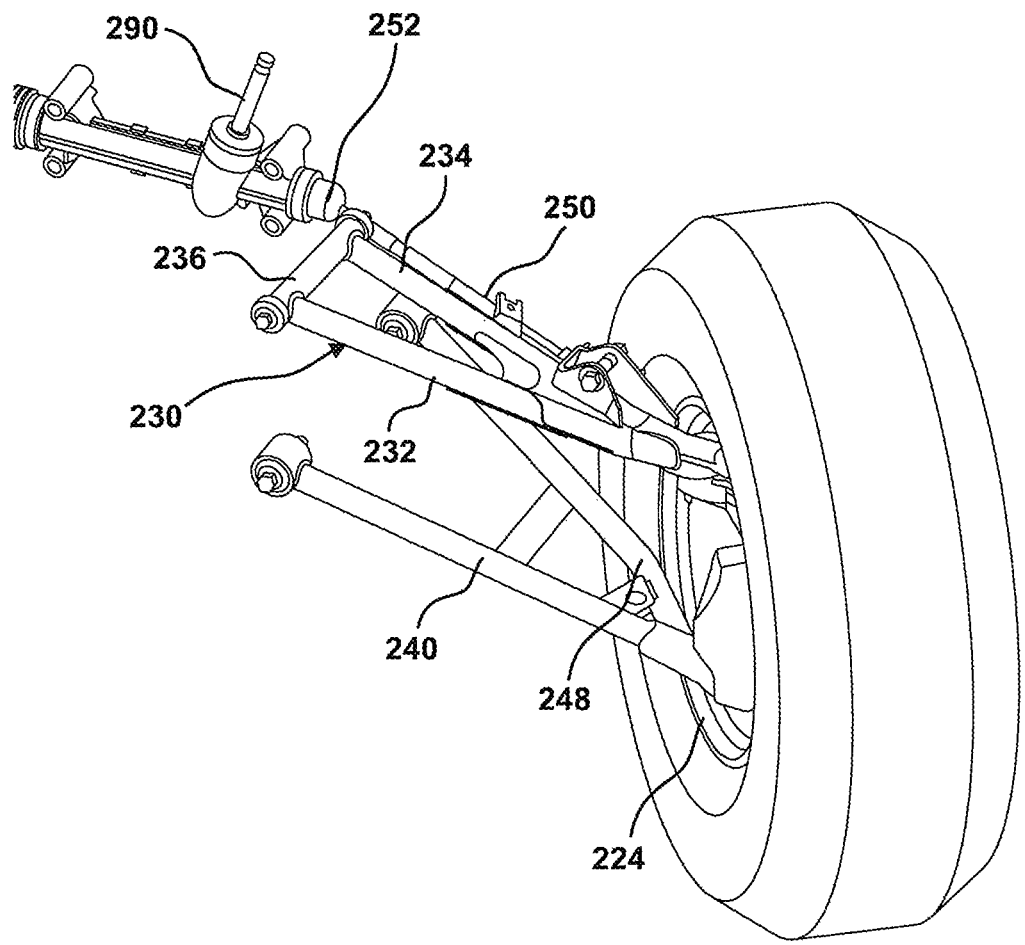
FIG. 3 shows perspective view of an example steering system, according to an aspect of the disclosure.

FIG. 3 shows a perspective view of various components of the steering system 200. In particular, the tie rod 250 may be coupled to the rack and rack housing 270 via a ball joint 252. The ball joint 252 may allow the tie rod 250 to pivot with respect to the rack while translating laterally along with the rack. In an aspect, a compressible stopper may be located between the ball joint 252 and the rack housing 270. The compressible stopper may absorb forces from an impact and reduce a chance of damage to the tie rod 250. In an aspect, the ball joint 252 may be covered with a flexible boot or gusset to prevent ingress of particulates. Grease may be contained within the boot and/or rack housing 270 to lubricate the ball joint, rack teeth, bushings, and other moving parts.

Figure 4:
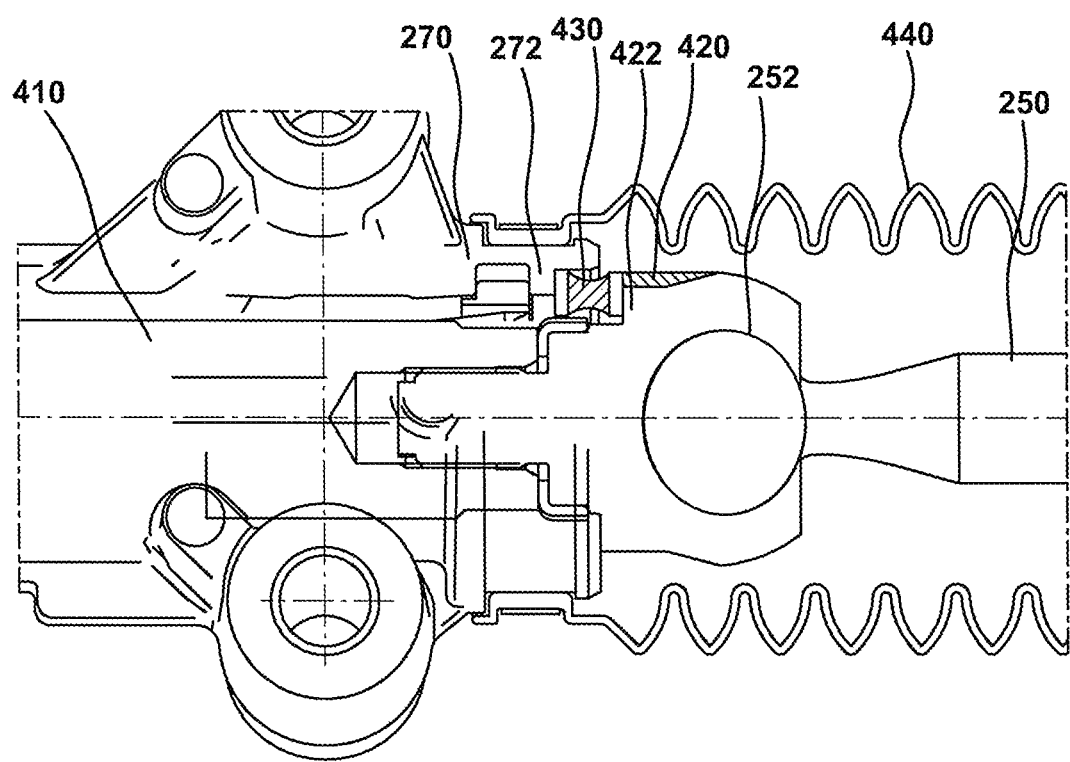
FIG. 4 shows a cross-sectional view of a portion of the example steering system of FIG. 3, according to an aspect of the disclosure.

FIG. 4 illustrates a cross-sectional view of a portion of the steering system 200 including the rack housing 270, ball joint 252, and tie rod 250. The rack 410 may be slidably movable within the rack housing 270. The end of the rack 410 may include a bore for receiving a socket portion 420 of the ball joint 252. For example, the socket portion 420 may have a threaded shaft that screws into matching threads of the bore of the rack 410. The compressible stopper 430 may be positioned between the rack housing 270 and the socket portion 420 of the ball joint 252. For example, the rack housing 270 may include an inner flange 272 that retains the compressible stopper 430. The socket portion 420 may include a shoulder 422 facing the inner flange 272 that contacts the compressible stopper 430 as the rack 410 approaches a maximum steering angle. Since the ball joint 252 is coupled to the rack 410, the compressible stopper 430 may resist movement of the rack 410 as the rack 410 approaches the maximum steering angle, and also absorb forces applied by the tie rod 250 to the rack 410 and/or rack housing 270 when the rack 410 is at the maximum steering angle.

The compressible stopper 430 may be an annular or ring-shaped disc that may be compressible along an axis through a central opening. The compressible stopper 430 may be, for example, a coil spring, a wave spring, a rubber ring, or a rubber ring bonded on one or both sides with a metal ring. The compressible stopper 430 may be compressible between a full height and a solid height. The full height may be a dimension to which the compressible stopper 430 expands when no pressure is applied to the compressible stopper. In an aspect, for example, a full height may be in the range of 8-10 mm. The solid height may be a minimum height to which the compressible stopper 430 can be compressed. In an aspect, the solid height may be defined by a height at a threshold force that is less than a force that will cause buckling of the tie rod 250. For example, the threshold force may be less than 16.7 kN minimum. Accordingly, the solid height may be, for example, a height of the compressible stopper 430 when a 15 kN force is applied to the compressible stopper. In an aspect, for example, a solid height of the compressible stopper 430 may be approximately half of the full height. For example, the solid height may be in the range of 4-6 mm.

Figure 5A:
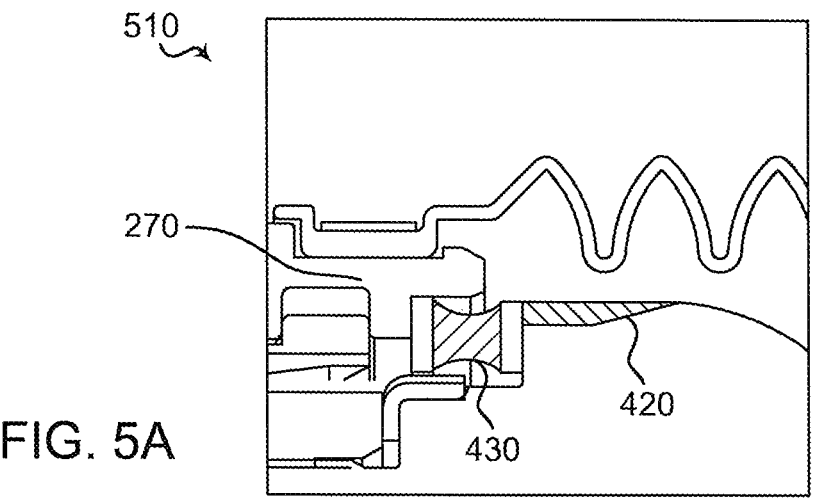
FIGS. 5A-C show a series of cross-sectional views showing compression of a compressible stopper, according to aspects of the disclosure.
Figure 5B:
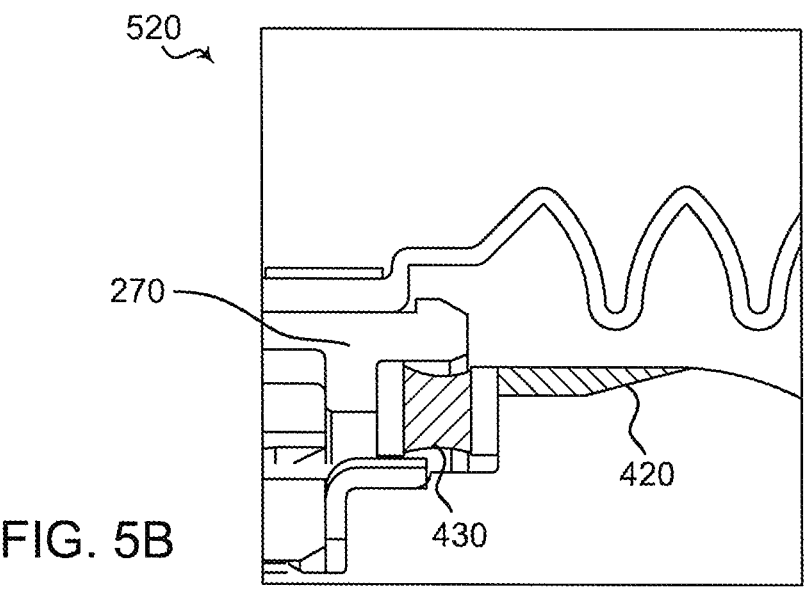
Figure 5C:
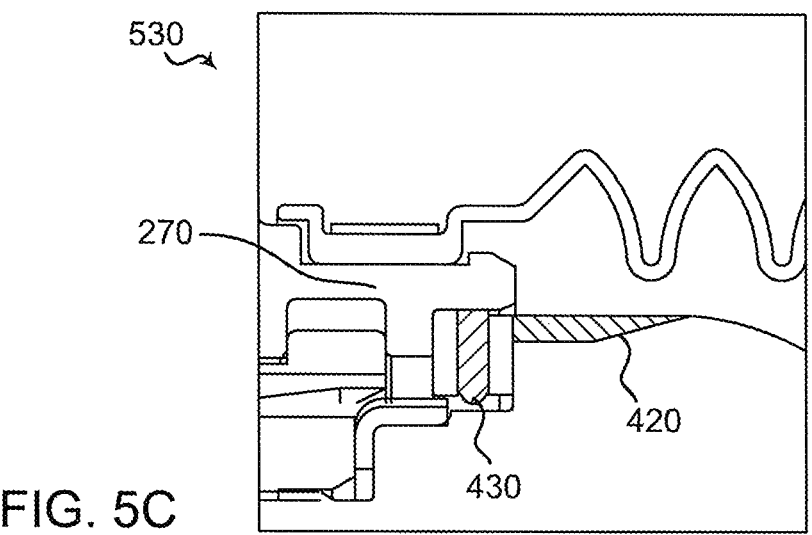

FIGS. 5A-C show a series of cross-sectional views showing stages of compression of the compressible stopper 430. In stage 510, shown in FIG. 5A, the compressible stopper 430 may be at a full height. The rack 410 may be approaching a maximum steering angle, but have not yet reached the maximum steering angle. The ball joint 252 may be in contact with the compressible stopper 430, and the compressible stopper 430 may be in contact with the rack housing 270.

In stage 520, shown in FIG. 5B, the rack 410 may be at a maximum steering angle. That is, further turning of the steering wheel 210 may be prevented. The compressible stopper 430 may be partially compressed. For example, as illustrated, the compressible stopper may have been compressed 1 mm. The compression between the full height and the height of the compressible stopper 430 at the maximum steering angle may be approximately one-third of a total compression of the compressible stopper 430. The compressible stopper 430 may exert a force on the socket portion 420 of the ball joint 252 that is equivalent to a load that a driver or vehicle is capable of producing during normal usage. The force may prevent the inner surface 224 of the wheel 220 from contacting the curved portion 248 of the lower control arm 240.

In stage 530, shown in FIG. 5C, the tie rod 250 may be moved beyond the maximum steering angle, for example, by an impact to the wheel 220 and/or the tire 222. The tie rod 250 may cause further compression of the compressible stopper 430 toward the solid height. For example, as illustrated, the compressible stopper 430 may compress an additional 2 mm beyond the height at the maximum steering angle. This additional compression may absorb force from the tie rod 250, thereby preventing damage (e.g., buckling) to the tie rod 250. Movement of the tie rod 250 beyond the stage 530 may be prevented by contact of the curved portion 248 of the lower control arm 240 with the inner surface 224 of the wheel 220. That is, the size and compressive characteristics of the compressible stopper 430, as well as the length of the tie rod 250, may be selected such that the contact between the curved portion 248 and the inner surface 224 stops movement of the tie rod 250 as the compressible stopper 430 reaches the solid height. In particular, the contact between the curved portion 248 and the inner surface 224 may stop movement of the tie rod 250 before the compressive force on the compressible stopper 430 exceeds the buckling force of the tie rod 250. Accordingly, the compressible stopper 430 may prevent damage to the tie rod 250 and also dampen the impact of the contact between the curved portion 248 and the inner surface 224 in the case where an impact, or other force, turns the steerable wheel 220 beyond the maximum steering angle.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A steering system for a vehicle, comprising:
    a wheel having an inner surface and an outer surface, and a tire mounted thereon;
    a wheel support comprising an upper arm and a lower arm that rotatably support the wheel, wherein at least one of the upper arm and the lower arm includes a curved member positioned to contact the inner surface of the wheel when the wheel is at a maximum steering angle;
    a steering rack;
    a tie rod coupled between the steering rack and the wheel support; and
    a compressible stopper coupled between the tie rod and the steering rack, the stopper configured to compress as the wheel is turned toward the maximum steering angle and when the tie rod is moved past the maximum steering angle.

2. The steering system of claim 1, wherein the curved member is a rear member of the lower arm.

3. The steering system of claim 1, wherein the compressible stopper is one of a coil spring, wave spring, rubber bushing, or bonded rubber bushing.

4. The steering system of claim 1, wherein the tie rod is coupled to the steering rack via a ball joint that engages the compressible stopper.

5. The steering system of claim 4, wherein the compressible stopper is located between the ball joint and a steering rack housing.

6. The steering system of claim 1, wherein the compressible stopper is compressible between a full height and a solid height.

7. The steering system of claim 6, wherein the curved member contacts the inner surface of the wheel when the compressible stopper is between the full height and the solid height.

8. The steering system of claim 6, wherein a force to compress the compressible stopper to the solid height is less than a buckling force of the tie rod.

9. The steering system of claim 6, wherein the force to compress the compressible stopper to the solid height is at least 15 kN.

10. A vehicle, comprising:
    at least two steerable wheels, each having an inner surface and an outer surface, and a tire mounted thereon;
    a wheel support for each steerable wheel comprising an upper arm and a lower arm that rotatably support the steerable wheel, wherein at least one of the upper arm and the lower arm includes a curved member positioned to contact the inner surface of the steerable wheel when the steerable wheel is at a maximum steering angle;
    a steering rack;
    a tie rod coupled between a respective end of the steering rack and the respective wheel support; and
    a compressible stopper coupled between the respective tie rod and the respective end of the steering rack, the stopper configured to compress as the wheel is turned toward the maximum steering angle and when the tie rod is moved past the maximum steering angle.

11. The vehicle of claim 10, wherein the force to compress the compressible stopper to the solid height is at least 15 kN.

12. The vehicle of claim 10, wherein the curved member is a rear member of the lower arm.

13. The vehicle of claim 10, wherein the compressible stopper is one of a coil spring, wave spring, rubber bushing, or bonded rubber bushing.

14. The vehicle of claim 10, wherein the tie rod is coupled to the steering rack via a ball joint that engages the compressible stopper.

15. The vehicle of claim 14, wherein the compressible stopper is located between the ball joint and a steering rack housing.

16. The vehicle of claim 10, wherein the compressible stopper is compressible between a full height and a solid height.

17. The vehicle of claim 16, wherein the curved member contacts the inner surface of the respective wheel when the compressible stopper is between the full height and the solid height.

18. The vehicle of claim 16, wherein a force to compress the compressible stopper to the solid height is less than a buckling force of the tie rod.

19. A method of preventing damage to a steering system for a vehicle, comprising:
    providing a wheel support comprising an upper arm and a lower arm that rotatably support a wheel, wherein at least one of the upper arm and the lower arm includes a curved member positioned to contact an inner surface of the wheel when the wheel is at a maximum steering angle;
    providing a compressible stopper coupled between a steering rack and a tie rod coupling the steering rack to the wheel support;
    compressing the stopper as the wheel is turned toward the maximum steering angle; and
    further compressing the stopper when the tie rod is moved past the maximum steering angle until the curved member contacts the inner surface of the wheel.

20. The method of claim 19, wherein a force to compress the stopper when the curved member contacts the inner surface of the wheel is less than a buckling force of the tie rod.

* * * * *